(12) United States Patent
Martone et al.

(10) Patent No.: US 10,564,257 B2
(45) Date of Patent: Feb. 18, 2020

(54) SPECTRUM SENSING FOR ADVANCED RADAR PERFORMANCE

(71) Applicant: U.S. Army Research Laboratory ATTN: RDRL-LOC-I, Adelphi, MD (US)

(72) Inventors: Anthony F. Martone, Ellicott City, MD (US); Kenneth I. Ranney, Rockville, MD (US); Kelly D. Sherbondy, Burke, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 411 days.

(21) Appl. No.: 15/422,553

(22) Filed: Feb. 2, 2017

(65) Prior Publication Data
US 2018/0217230 A1    Aug. 2, 2018

(51) Int. Cl.
*G01S 7/40* (2006.01)
*G01S 7/02* (2006.01)
*G01S 13/00* (2006.01)

(52) U.S. Cl.
CPC ............ *G01S 7/4008* (2013.01); *G01S 7/023* (2013.01); *G01S 2007/4013* (2013.01)

(58) Field of Classification Search
CPC ................... G01S 7/4008; G01S 7/023; G01S 2007/4013; H04L 27/0006
See application file for complete search history.

(56) References Cited

U.S. PATENT DOCUMENTS

| 7,260,054 | B2 * | 8/2007 | Olszewski | H04B 17/336 370/208 |
| 8,184,036 | B2 * | 5/2012 | Charland | H04B 17/327 342/5 |
| 8,830,812 | B2 * | 9/2014 | Ashikhmin | H04B 3/32 370/201 |
| 9,435,882 | B2 | 9/2016 | Martone et al. | |
| 9,635,508 | B2 * | 4/2017 | Martone et al. | H04L 27/0006 |
| 10,067,221 | B2 * | 9/2018 | Ginsburg | G01S 7/023 |
| 10,101,436 | B2 * | 10/2018 | Martone | G01S 7/023 |

(Continued)

OTHER PUBLICATIONS

U.S. Appl. No. 14/822,949, filed Aug. 11, 2015.
(Continued)

*Primary Examiner* — Bernarr E Gregory
(74) *Attorney, Agent, or Firm* — Eric B. Compton (57) ABSTRACT

A spectrum sensing radar system including a spectrum power sensing module configured to sense electromagnetic signal powers in a plurality of sub-frequencies and generate a sensed power set including a plurality of sensed electromagnetic signal powers corresponding to each of the plurality of sub-frequencies; a multi-objective function module configured to receive the sensed power set and calculate a first objective function for each of the plurality of sub-frequencies, wherein the first objective function includes a power function divided by an empirical measure of interference of the sensed power set to form a signal plus noise objective function for a sub-frequency of the plurality of sub-frequencies, and wherein the power function further includes a peak transmit power of the radar system multiplied by a gain of an antenna of the radar system, multiplied by a wavelength of a carrier of the sub-frequency.

20 Claims, 7 Drawing Sheets

(56) References Cited

U.S. PATENT DOCUMENTS

| | | | | |
|---|---|---|---|---|
| 2008/0057869 A1* | 3/2008 | Strong | ............... | H04L 27/2608 455/63.1 |
| 2015/0201420 A1 | 7/2015 | Martone et al. | | |
| 2015/0253415 A1* | 9/2015 | Mazzaro | ................ | G01S 13/04 342/27 |
| 2015/0323649 A1* | 11/2015 | Lee | ......................... | G01S 13/04 342/27 |
| 2016/0033622 A1* | 2/2016 | Martone | ................ | G01S 13/04 342/18 |
| 2018/0074165 A1* | 3/2018 | Martone | ................ | G01S 7/023 |

OTHER PUBLICATIONS

A. Aubry, A. De Maio, M. Piezzo, M. M. Naghsh, M. Soltanalian and P. Stoica, "Cognitive radar waveform design for spectral coexistence in signal-dependent interference," Radar Conference, 2014 IEEE, Cincinnati, OH, 2014, pp. 0474-0478.

H. Wang, J. Johnson, C. Baker, L. Ye, and C. Zhang, "On spectrum sharing between communications and air traffic control radar systems," in proceedings of the 2015 IEEE Radar Conference, Arlington, VA, 2015, pp. 1545-1550.

S.S. Bhat, R.M. Narayanan, and M. Rangaswamy, "Bandwidth sharing and scheduling formultimodal radar with communications and tracking," IETE Journal of Research, vol. 59, No. 5, pp. 551-562, 2013.

A.F. Martone, K.D. Sherbondy, K.I. Ranney, and T.V. Dogaru, "Passive sensing for adaptable radar bandwidth," in Proceedings of the IEEE International Radar Conference, Arlington, VA, USA, May 2015.

A.F. Martone, K.A. Gallagher, K.D. Sherbondy, et al., "Adaptable Bandwidth for Harmonic Step-Frequency Radar," International Journal of Antennas and Propagation, vol. 2015, Jul. 2015, Article ID 808093.

A.F. Martone, K.D. Sherbondy, and K.I. Ranney, "Genetic Algorithm for Adaptable Radar Bandwidth," in Proceedings of the IEEE Radar Conference, Philadelphia, PA, USA, May 2016.

A.F. Martone, and K. Ranney, "Fast Technique for Wideband Spectrum Sensing," in Proceedings of the 2014 IEEE International Symposium on Antennas and Propagation, Memphis, Tennessee, Jul. 2014.

A.F. Martone, K.I. Ranney, A.J. Mazzaro, D.M. McNamara, J. Silvious, K.D. Sherbondy, K.A. Gallagher, and R.M. Narayanan, "Spectrum Sensing Techniques for Nonlinear Radar", in Proceedings of SPIE Radar Sensor Technology XVIII, vol. 9077, Baltimore, MD, May 2014.

* cited by examiner

SPECTRUM SENSING FOR ADVANCED RADAR PERFORMANCE

GOVERNMENT INTEREST

The embodiments herein may be manufactured, used, and/or licensed by or for the United States Government without the payment of royalties thereon.

BACKGROUND

Technical Field

The embodiments herein generally relate to radar systems, and more particularly to spectrum sensing radar systems.

Description of the Related Art

Radar systems provide detection of an object via generating an electromagnetic signal and receiving a reflection of the electromagnetic signal from the object. Conventionally, properties related to the object, for example distance of the object, may be determined using the reflected electromagnetic signal. Radar systems have vast applications in aerospace, civilian and military aviation, guided missiles, weather forecast, study of soil for agricultural purposes, etc. However, the increased congestion in using the electromagnetic spectrum presents new challenges for radar systems. It is desirable to maintain or increase the accuracy and functionality of radar systems while operating in a congested spectrum.

SUMMARY

In view of the foregoing, an embodiment herein provides a spectrum sensing radar system comprising a spectrum power sensing module configured to sense electromagnetic signal powers in a plurality of sub-frequencies; and generate a sensed power set comprising a plurality of sensed electromagnetic signal powers corresponding to each of the plurality of sub-frequencies; a multi-objective function module configured to receive the sensed power set from the spectrum power sensing module; and calculate a first objective function for each of the plurality of sub-frequencies, wherein the first objective function comprises a power function divided by an empirical measure of interference to form a signal to interference plus noise (SINR) for a sub-frequency of the plurality of sub-frequencies, and wherein the power function further comprises a peak transmit power of the radar system multiplied by a gain of an antenna of the radar system, multiplied by a wavelength of a carrier of the sub-frequency. The power function may further comprise a pulse width of the radar system multiplied by the wavelength of the carrier of the sub-frequency. The power function may further comprise a number of pulses within a coherent processing interval of the radar system multiplied by the pulse width of the radar system, further multiplied by an index of the sub-frequency. The power function may further comprise the index of the sub-frequency divided by a range to a target. The multi-objective function module may further be configured to calculate a second objective function comprising a bandwidth of the radar system. The multi-objective function module may further be configured to maximize the first objective function and simultaneously maximize the second objective function, subject to the first objective function being greater than a minimum SINR pre-determined boundary, and subject to the second objective function being greater than a minimum bandwidth pre-determined boundary. The multi-objective function module may further be configured to determine a radar transmit frequency set, a radar transmit power set, and a radar transmit bandwidth set that maximize the first and second objective functions.

The spectrum sensing radar system may further comprise a radar transceiver configured to receive the radar transmit frequency set and the radar transmit bandwidth set from the multi-objective function module; generate electromagnetic signals in accordance with the radar transmit frequency set, the radar transmit power set, and the radar transmit bandwidth set; and receive reflections of the electromagnetic signals from the target. Upon the radar transceiver transmitting the electromagnetic signals, the spectrum power sensing module may be configured to repeat the sensing electromagnetic signal power in the plurality of sub-frequencies; and generate a new sensed power set comprising a plurality of newly sensed electromagnetic signal powers corresponding to each of the plurality of sub-frequencies.

Upon the spectrum power sensing module generating the new sensed power set, the multi-objective function module may be configured to receive the new sensed power set from the spectrum power sensing module; recalculate the first and second objective functions using the new sensed power set; and generate a new radar transmit frequency set, a new radar transmit power set, and a new radar transmit bandwidth set that maximize the recalculated first and second objective functions.

An embodiment herein provides a method of operating a spectrum sensing radar system, the method comprising sensing, using a spectrum power sensing module, electromagnetic signal powers in a plurality of sub-frequencies; generating, using the spectrum power sensing module, a sensed power set comprising a plurality of sensed electromagnetic signal powers corresponding to each of the plurality of sub-frequencies; receiving, using a multi-objective function module, the sensed power set from the spectrum power sensing module; and calculating, using the multi-objective function module, a first objective function for each of the plurality of sub-frequencies, wherein the first objective function comprises a power function divided by an empirical measure of interference to form a signal to interference plus noise (SINR) for a sub-frequency of the plurality of sub-frequencies, and wherein the power function further comprises a peak transmit power of the radar system multiplied by a gain of an antenna of the radar system, multiplied by a wavelength of a carrier of the sub-frequency.

The power function may further comprise a pulse width of the radar system multiplied by the wavelength of the carrier of the sub-frequency, and wherein the power function may further comprise a number of pulses within a coherent processing interval of the radar system multiplied by the pulse width of the radar system, further multiplied by an index of the sub-frequency, and wherein the power function may further comprise the index of the sub-frequency divided by a range to a target.

The multi-objective function module may be further configured to calculate a second objective function comprising a bandwidth of the radar system, and wherein the multi-objective function module may be further configured to maximize the first objective function and simultaneously maximize the second objective function, subject to the first objective function being greater than a minimum SINR pre-determined boundary, and subject to the second objective function being greater than a minimum bandwidth pre-determined boundary. The multi-objective function module may further be configured to determine a radar transmit frequency set, a radar transmit power set, and a radar transmit bandwidth set that maximize the first and second objective functions.

The method may be further comprising receiving, using a radar transceiver, the radar transmit frequency set and the radar transmit bandwidth set from the multi-objective function module; generating, using the radar transceiver, electromagnetic signals in accordance with the radar transmit frequency set, the radar transmit power set, and the radar transmit bandwidth set; and receiving, using the radar transceiver, reflections of the electromagnetic signals from the target, wherein upon the radar transceiver transmitting the electromagnetic signals, the method further comprising repeating, by the spectrum power sensing module, the sensing electromagnetic signal power in the plurality of sub-frequencies; and generating, by the spectrum power sensing module, a new sensed power set comprising a plurality of newly sensed electromagnetic signal powers corresponding to each of the plurality of sub-frequencies, and wherein upon the spectrum power sensing module generating the new sensed power set, the method further comprising receiving, by the multi-objective function module, the new sensed power set from the spectrum power sensing module; recalculating, by the multi-objective function module, the first and second objective functions using the new sensed power set; and generating, by the multi-objective function module, a new radar transmit frequency set, a new radar transmit power set, and a new radar transmit bandwidth set that maximize the recalculated first and second objective functions.

An embodiment herein provides a non-transitory program storage device readable by computer, and comprising a program of instructions executable by the computer to perform a method of operating a spectrum sensing radar system, the method comprising sensing, using a spectrum power sensing module, electromagnetic signal powers in a plurality of sub-frequencies; generating, using the spectrum power sensing module, a sensed power set comprising a plurality of sensed electromagnetic signal powers corresponding to each of the plurality of sub-frequencies; receiving, using a multi-objective function module, the sensed power set from the spectrum power sensing module; and calculating, using the multi-objective function module, a first objective function for each of the plurality of sub-frequencies, wherein the first objective function comprises a power function divided by an empirical measure of interference to form a signal to interference plus noise (SINR) for a sub-frequency of the plurality of sub-frequencies, and wherein the power function further comprises a peak transmit power of the radar system multiplied by a gain of an antenna of the radar system, multiplied by a wavelength of a carrier of the sub-frequency.

The power function may further comprise a pulse width of the radar system multiplied by the wavelength of the carrier of the sub-frequency, and wherein the power function may further comprise a number of pulses within a coherent processing interval of the radar system multiplied by the pulse width of the radar system, further multiplied by an index of the sub-frequency, and wherein the power function may further comprise the index of the sub-frequency divided by a range to a target. The multi-objective function module may be further configured to calculate a second objective function comprising a bandwidth of the radar system, and wherein the multi-objective function module may be further configured to maximize the first objective function and simultaneously maximize the second objective function, subject to the first objective function being greater than a minimum SINR pre-determined boundary, and subject to the second objective function being greater than a minimum bandwidth pre-determined boundary.

The multi-objective function module may be further configured to determine a radar transmit frequency set, a radar transmit power set, and a radar transmit bandwidth set that maximize the first and second objective functions. The method may be further comprising receiving, using a radar transceiver, the radar transmit frequency set and the radar transmit bandwidth set from the multi-objective function module; generating, using the radar transceiver, electromagnetic signals in accordance with the radar transmit frequency set, the radar transmit power set, and the radar transmit bandwidth set; and receiving, using the radar transceiver, reflections of the electromagnetic signals from the target, wherein upon the radar transceiver transmitting the electromagnetic signals, the method may be further comprising repeating, by the spectrum power sensing module, the sensing electromagnetic signal power in the plurality of sub-frequencies; and generating, by the spectrum power sensing module, a new sensed power set comprising a plurality of newly sensed electromagnetic signal powers corresponding to each of the plurality of sub-frequencies, and wherein upon the spectrum power sensing module generating the new sensed power set, the method may be further comprising: receiving, by the multi-objective function module, the new sensed power set from the spectrum power sensing module; recalculating, by the multi-objective function module, the first and second objective functions using the new sensed power set; and generating, by the multi-objective function module, a new radar transmit frequency set, a new radar transmit power set, and a new radar transmit bandwidth set that maximize the recalculated first and second objective functions.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Access to the electromagnetic spectrum is an ever-growing challenge for all the systems that use electromagnetic waves, including radar systems. Therefore, radar systems may be required to mitigate radio frequency interference (RFI) from other radio frequency (RF) sources, relocate to new frequency bands while maintaining quality of service, or share the frequency band with other RF systems. The spectrum sensing, multi-optimization (SS-MO) technique may be used as a possible solution to these challenges. The embodiments herein provide a technique to improve the signal to interference plus noise ratio (SINR) without a cost of a high computational complexity. An embodiment herein provides a method that is used in conjunction with weighted sum multi-objective optimization to maintain optimization performance while significantly lowering the computational complexity of the radar systems.

Some embodiments herein provide solutions to the challenge of scarcity of spectrum, by any of mitigating RFI from RF sources, relocating to new frequency bands while maintaining quality of service, and sharing the frequency band with other RF systems. An embodiment herein uses a fast weighted sum multi-objective optimization (fWSMO) technique to quickly assess the congestion level in the operating band of the radar to determine a sub-band for radar operation. The sub-band may be selected based on multi-objective optimization and significantly increases radar performance and lowers computational complexity.

An embodiment herein provides a combination of multiple desirable radar features including any of passive sensing, multi-objective optimization, signal processing for refined spectrum data, and a low computational complexity of spectrum analysis algorithm.

Referring now to the drawings, and more particularly to FIGS. 1 through 7, where similar reference characters denote corresponding features consistently throughout the figures, there are shown preferred embodiments.

Figure 1:
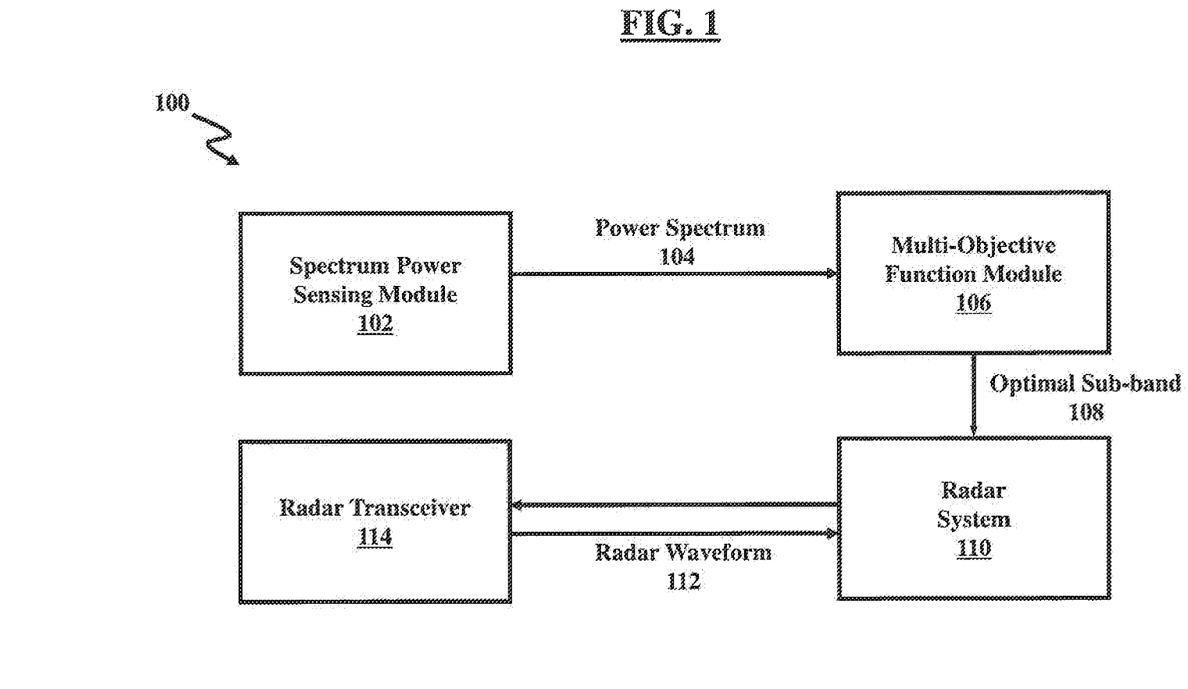
FIG. 1 illustrates a schematic diagram of a generalized spectrum sensing radar system according to an embodiment herein.

FIG. 1 is a schematic diagram illustrating a system 100 for identifying an optimal sub-band within an overall bandwidth, and to maximize SINR and bandwidth objective functions according to an embodiment herein. In an embodiment herein, the system 100 examines multiple sub-band choices of radar to identify the optimal sub-band.

In an embodiment herein, the system 100 may include a spectrum power sensing module 102 configured to passively monitor the operating band, B, of the radar. The spectrum power sensing module 102 may receive, digitize, and process the observed RF spectrum to generate a power spectrum $\Theta = \{\theta_1, \ldots \theta_N\}$ 104 of size N for frequencies $F = \{f_1, \ldots f_N\}$.

The frequency resolution of the power spectrum is defined as $F_r$ and remains constant. For this development, the frequency resolution for the radar and the spectrum power sensing module 102 is identical. In an embodiment herein, the spectrum power sensing module 102 may use the same RF front-end as the radar or a separate front-end. The specific configuration of system 100 is dependent on the application, radar type, and size, weight and power (SWaP) requirements.

In an embodiment herein, after the spectrum sensing process is complete, the radar begins operation using the full bandwidth B (without knowledge of the RFI) until the optimization technique converges to a solution. In an embodiment herein, a multi-objective function module 106 receives the power spectrum 104 from the spectrum power sensing module 102, and generates optimal sub-band 108. A radar system 110 may then receive the optimal sub-band 108. In an embodiment herein, the performance of the radar system 110 improves over time once the optimal sub-band 108 is made available to the radar system 100. The radar system 110 may then synthesize the appropriate waveform using the optimal frequency and bandwidth information provided by the optimization routine. Synthesized radar waveform 112 may then be transmitted to a radar transceiver 114 at the start of a next coherent processing interval (CPI). A CPI may include a group of radar pulses generated, reflected by an object and received by the radar transceiver 114. The radar pulses in a CPI may have the same frequency.

In an embodiment herein, the multi-objective function module 106 is used to form two objective functions. The power spectrum is used to form a SINR objective function:

$$Z_1(\beta_i, f_j) = P_r(\beta_i)/\Gamma(\beta_i, f_j), \tag{1}$$

where $P_r(\beta_i)$ is the received power modeled using a radar range equation. $\Gamma(\beta_i, f_j)$ is an empirical estimate of the interference for the $i^{th}$ sub-band, $\beta_i$. The $i^{th}$ sub-band is defined as $\beta_i = iF_r$ for $i = \{1, \ldots N\}$. The $j^{th}$ start frequency of a given sub-band is defined as $f_j \in F$ for $j = \{1, \ldots N\}$. The first goal is to adjust $\beta_i$ and $f_j$ to maximize Eq. (1). The received power is defined as:

$$P_r(\beta_i) = P_t G^2 \lambda^2 \sigma \tau N_P \beta_i / [(4\pi)^3 R^4] = C\beta_i, \tag{2}$$

where $P_t$ is the peak transmit power of the radar, G is the antenna gain, $\lambda$ is the wavelength of the carrier frequency, R is the range to target, $\sigma$ is the radar cross-section of the target, $\tau$ is the radar pulse width, $N_P$ is the number of pulses within a CPI, and C is a constant that replaces the product of the constant radar parameters. Eq. (2) supports a pulse compression waveform with the time-bandwidth (TB) product $\tau\beta_i$, however multiple waveform types may be supported. The sub-band size is the second objective function and is defined as:

$$Z_2(\beta) = \beta_i. \tag{3}$$

In an embodiment herein, the second goal is to adjust $\beta_i$ in order to maximize Eq. (3); this occurs when $\beta_i = B$.

The presence of $\beta_i$ in both Equations (1) and (3) sets up a fundamental conflict. In order to maximize Eq. (3), $\beta_i$ is required to be as large as possible. This implies, however, that more RFI is present as $\beta_i$ increases thereby decreasing SINR. In an embodiment herein, multi-objective optimization is used to maximize these conflicting objective functions by defining the decision variable $x = \{\beta_i, f_j\}$ that forms the solution space X. The goal of the optimization process is to find the optimal solution, $x^* = \{\beta_i^*, f_j^*\}$, such that the objective functions in Equations (1) and (3) are maximized:

$$Z(\beta_i^*, f_j^*) = \{Z_1(\beta_i^*, f_j^*), Z_2(\beta_i^*)\} \tag{4}$$

subject to $Z_1(\beta_i^*, f_j^*) \geq Z_{1,min}$ and $Z_2(\beta_i^*) \geq Z_{2,min}$, where $Z_{1,min}$ and $Z_{2,min}$ are the boundary conditions for minimum SINR and bandwidth (respectively) allowable for radar operation. The solution in Eq. (4) is considered feasible if it satisfies these boundary conditions. For a given power spectrum, the maximum value of SINR is found as:

$$Z_{1,max} = \max[Z_1(\beta_i, f_j)]. \quad (5)$$

In an embodiment herein, the weighted sum multi-objective optimization (WSMO) approach uses the following recursive algorithm (exhaustive search) to form the empirical estimate of interference and noise:

$$\Gamma(\beta_i, f_j) = \begin{cases} \theta_j, & i=1, j=1, \ldots N \\ \Gamma(\beta_1, f_j) + \Gamma(\beta_1, f_{j+1}), & i=2, j=1, \ldots N-1 \\ \Gamma(\beta_{i-1}, f_j) + \Gamma(\beta_1, f_{i+j-1}) & i=3, \ldots N, j=1, \ldots N-i+1 \end{cases} \quad (6)$$

The following linear weighting function is next used to combine the objective functions:

$$Z(\beta_i, f_j) = \alpha \dot{Z}_1(\beta_i, f_j) + (1-\alpha) \dot{Z}_2(\beta_i) \quad (7)$$

where $0 \leq \alpha \leq 1$ is the weighting parameter, $\dot{Z}_1(\beta_i, f_j)$ is the normalized objective function of $Z_1(\beta_i, f_j)$, and $\dot{Z}_2(\beta_i)$ is the normalized objective function of $Z_2(\beta_i)$. Then $\{\beta_i^*, f_j^*\}$ is solved using:

$$(\beta_i^*, f_i^*) = \underset{(\beta_i, f_j)}{\operatorname{argmax}}[Z(\beta_i, f_j)]. \quad (8)$$

The computational complexity of the weighted sum approach, as reported in may result in $N^2$ summations and $(3N^2 + 2N)$ multiplications/divisions, and is of order $O(N^2)$ (very high complexity).

Figure 2:
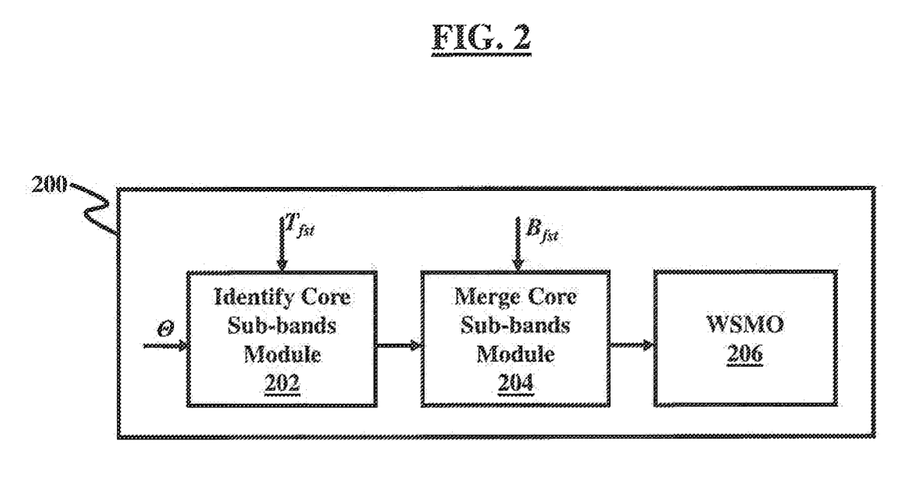
FIG. 2 illustrates a schematic diagram of a multi-objective optimization implemented according to an embodiment herein.

FIG. 2, with reference to FIG. 1, is a schematic diagram illustrating a system 200 for implementing the fWSMO technique, according to an embodiment herein. In an embodiment herein, the identify core sub-bands module 202 and the merge core sub-bands module 204 perform the refinement operations considering the optimum sub-band 108 for radar operation. The power spectrum Θ is first input into the identify core sub-bands module 202 of the fWSMO system 200.

In FIG. 2, the identify core sub-band module 202 of the fWSMO system 200, first identifies regions of low and high power interference, where each region corresponds to a core sub-band. The core sub-bands constitute a new, refined power spectrum estimate and are used by the merge core-sub-bands module 104 to replace the power spectrum Θ as input to the WSMO module 206. The set of $K \leq N$ core sub-bands are defined herein as $\Phi = \{\Phi_1, \ldots \Phi_K\}$ and let $\Phi_k \in \Phi$. The core sub-band $\Phi_k$ may have an associated start position $\overline{S}_k \in \{1, \ldots N\}$, stop position $\overline{E}_k \in \{1, \ldots N\}$, length (i.e. the number of frequency bins) $\overline{I}_k \in \{1, \ldots N\}$, and a measure of interference power $\overline{\Gamma}_k = \sum_{n=\overline{S}_k}^{\overline{E}_k} \theta_n$. $\Phi_k$ is defined as a "low power core sub-band" when $\theta_n < T_{fst}$ for all $n \in \{\overline{S}_k, \ldots \overline{E}_k\}$. $\Phi_k$ is defined as a "high power core sub-band" when $\theta_n \geq T_{fst}$ for all $n \in \{\overline{S}_k, \ldots \overline{E}_k\}$. In an embodiment herein, the core sub-bands may be either low or high power, but not a combination of both, and may alternate between low and high power; i.e., a low power core sub-band may be surrounded by high power core sub-bands, or a high power core sub-band may be surrounded by low power core sub-bands.

The start and end positions are used to compute the center frequency $f_j$ of the core sub-band, and the length is used to compute the bandwidth $\beta_i$. The computational complexity of this process is dependent on the summations used to find $\overline{\Gamma}_k$ and $\overline{I}_k$ and is of order $O(N)$.

Figure 3:
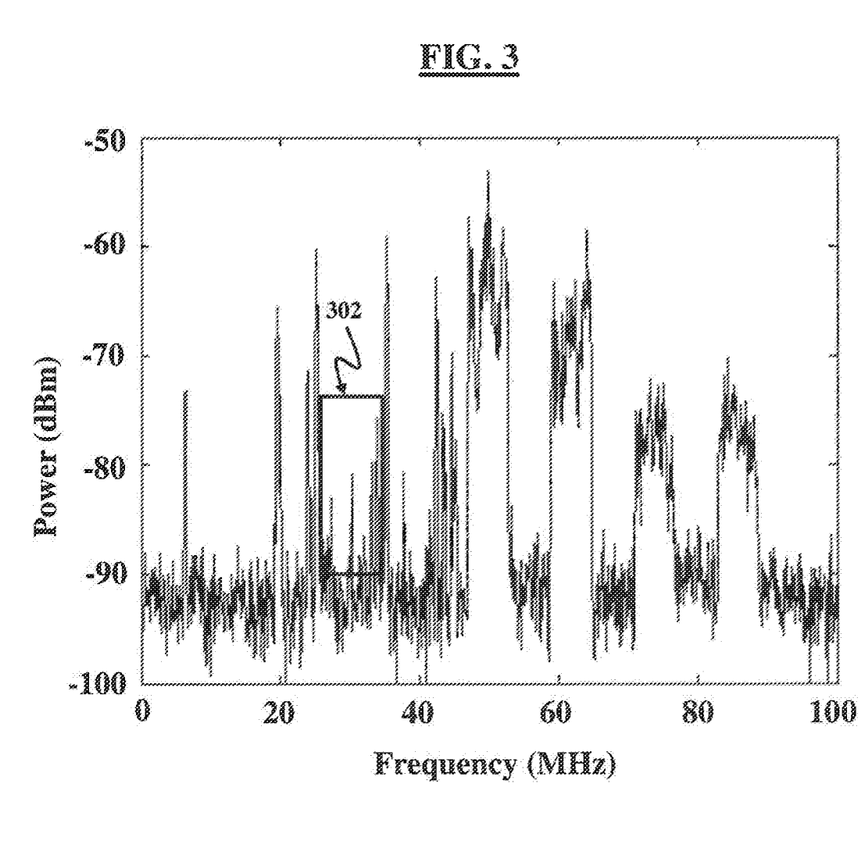
FIG. 3 illustrates an example power spectrum used for illustration purposes according to an embodiment herein.

In an embodiment herein, the spectrum may contain closely spaced narrowband interference resulting in a cluster of several core sub-bands. FIG. 3, with reference to FIGS. 1 through 2, is a graph illustrating an exemplary power spectrum measurement, according to an embodiment herein. The exemplary power spectrum illustrated in FIG. 3 is collected by a spectrum analyzer with B=100 MHz and $F_r$=0.1 MHz. FIG. 3 illustrates an example of the cluster of closely-spaced core sub-bands 302, where nine core sub-bands exist within a 5 MHz bandwidth. If the number of core sub-bands is large such that $K \approx N$, then the computation complexity of WSMO would result in $O(N^2)$; ideally $K \ll N$. The second step in fWSMO is to merge these closely-spaced core-sub-bands. A merged sub-band is then considered high power since it contains interference from the high power core-bands. The length of all low power core sub-bands in Φ must therefore be examined.

Let $\Phi_k$ correspond to a low power core sub-band; than $\Phi_k$ is merged with $\Phi_{k-1}$ and $\Phi k_{+1}$ if $\overline{I}_k \leq B_f$, where $B_f = B_{fst}/F_r$, and $B_{fst}$ is a user defined threshold corresponding to the required bandwidth of the low power core sub-bands. Define the set of $\hat{K} \leq K$ merged core sub-bands as $\hat{\Phi} = \{\hat{\Phi}_1, \ldots \hat{\Phi}_{\hat{K}}\}$ with start position $\hat{S}_{\hat{k}} \in \{1, \ldots K\}$, stop position $\hat{E}_{\hat{k}} \in \{1, \ldots K\}$, length $\hat{I}_{\hat{k}} = \sum_{l=-1}^{1} \overline{I}_{k+l}$, interference power $\hat{\Gamma}_{\hat{k}} = \sum_{l=-1}^{1} \overline{\Gamma}_{k+l}$, and $\hat{k} \in \{1, \ldots \hat{K}\}$. This merging process reduces the number of core sub-bands to $\hat{K} \leq K$. The computational complexity of this process is dependent on the summations used to find $\hat{\Gamma}_{\hat{k}}$ and $\hat{I}_{\hat{k}}$ and is of order $O(K)$.

The bandwidth and center frequency pairs $\{\hat{\beta}_{\hat{k}}, \hat{f}_{\hat{k}}\}$ of the merged core sub-bands $\hat{\Phi}$ are next input to WSMO module 206 (of FIG. 2) and processed by Equations (7) and (8) to estimate $\{Z_1(\hat{\beta}_{\hat{k}}^* \hat{f}_{\hat{k}}^*), Z_2(\hat{\beta}_{\hat{k}}^*)\}$.

Each bandwidth and center frequency pair is defined as $\hat{\beta}_{\hat{k}} = \hat{I}_{\hat{k}} F_r$, and $$\hat{f}_{\hat{k}} = f_{\hat{S}_{\hat{k}}}.$$

The computational complexity of WSMO results in $\hat{K}^2$ summations and $(3\hat{K}^2 + 2\hat{K})$ multiplications/divisions. This computational complexity is of order $O(\hat{K}^2)$. The merging process reduces the set of solutions found by WSMO, and it is therefore possible that the optimal solution is not reached.

Figure 4:
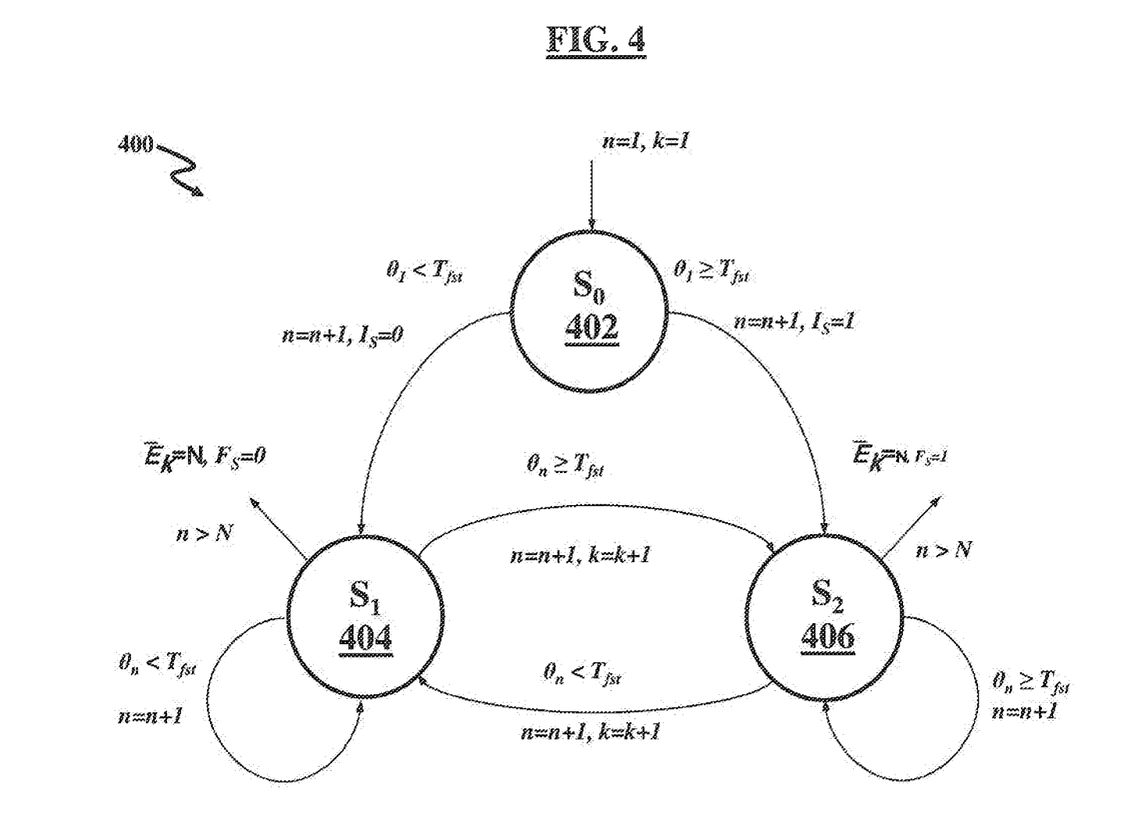
FIG. 4 illustrates a schematic diagram of a state space model used to identify core sub-bands according to an embodiment herein.

FIG. 4, with reference to FIGS. 1 through 3, is a state diagram 400 illustrating a method for identifying core sub-bands, according to an embodiment herein. The action assignments for each state transition of the state diagram 400 are shown in Table I, in accordance with an embodiment herein. Note that a minimal number of summations are needed for each state transition with no multiplications. In an embodiment herein, the initialization state $S_0$ 402 compares the first power sample $\theta_1$ to $T_{fst}$ to determine if this power sample belongs to a low power core sub-band or a high power core sub-band. The binary variables $I_S \in \{0,1\}$ and $F_S \in \{0,1\}$ denote the initial and final transition states (0 for $S_1$ 404, or 1 for $S_2$ 406) and may be used for the merging process. The state $S_1$ 404 collects information (Table I) on low power core sub-bands when $\theta_n < T_{fst}$.

TABLE I

Action table for the state space diagram of FIG. 4

|  | n | k | $\bar{I}_k$ | $\bar{\Gamma}_k$ | $\bar{S}_k$ | $\bar{E}_k$ | Sum |
|---|---|---|---|---|---|---|---|
| IC | 1 | 1 | $\bar{I}_1 = 1$ | $\bar{\Gamma}_1 = \theta_1$ | $\bar{S}_1 = 1$ | NA | 0 |
| $S_0\ 402 \rightarrow S_1\ 404$ | n + 1 | NA | NA | NA | NA | NA | 1 |
| $S_0\ 402 \rightarrow S_2\ 406$ |  |  |  |  |  |  |  |
| $S_1\ 404 \rightarrow S_1\ 404$ | n + 1 | NA | $\bar{I}_k = \bar{I}_k + 1$ | $\bar{\Gamma}_k = \bar{\Gamma}_k + \theta_n$ | NA | NA | 3 |
| $S_1\ 404 \rightarrow S_2\ 406$ | n + 1 | k + 1 | $\bar{I}_{k+1} = 1$ | $\bar{\Gamma}_{k+1} = \theta_n$ | $\bar{S}_{k+1} = n$ | $\bar{E}_k = n - 1$ | 3 |
| $S_2\ 406 \rightarrow S_1\ 404$ | n + 1 | k + 1 | $\bar{I}_{k+1} = 1$ | $\bar{\Gamma}_{k+1} = \theta_n$ | $\bar{S}_{k+1} = n$ | $\bar{E}_k = n - 1$ | 3 |
| $S_2\ 406 \rightarrow S_2\ 406$ | n + 1 | NA | $\bar{I}_k = \bar{I}_k + 1$ | $\bar{\Gamma}_k = \bar{\Gamma}_k + \theta_n$ | NA | NA | 3 |

Figure 5:
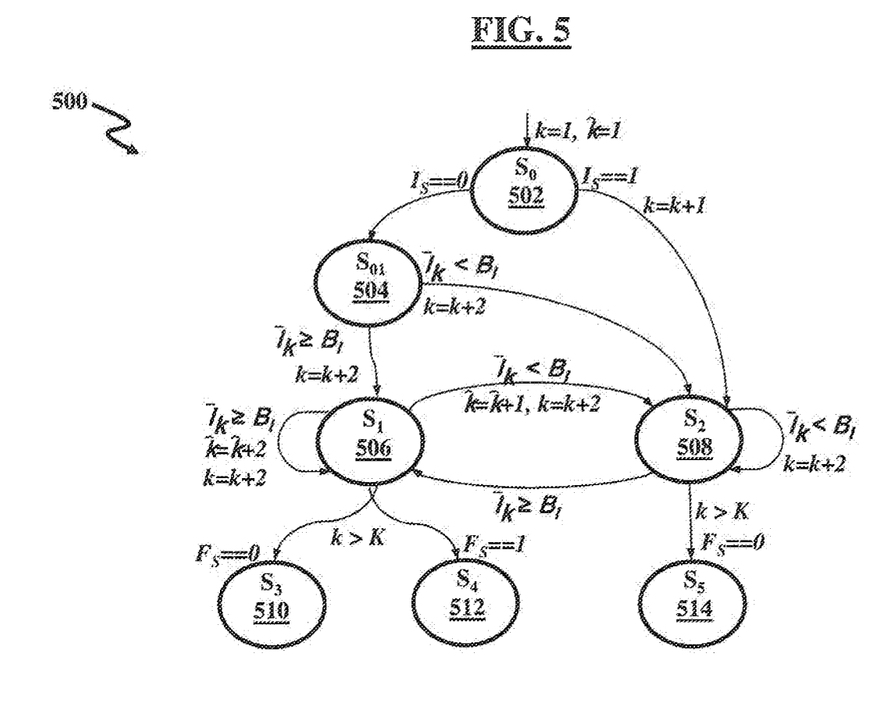
FIG. 5 illustrates a schematic diagram of a state space model used to merge core sub-bands according to an embodiment herein.

FIG. 5, with reference to FIGS. 1 through 4, is a state diagram 500 illustrating a method to merge core sub-bands. The action assignments of the state diagram 500 are shown in Table II, in accordance with an embodiment herein. Once again a minimal number of summations are needed for each state transition with no multiplications. Many of the sums needed for transition are used for indexing purposes. The initialization state $S_0$ 502 uses $I_S$ to determine if the first core sub-band is low or high power. If $I_S$ equals 1, then the initial core sub-band is high power and initial conditions are stored for a possible merge. If $I_S$ equals 0, then state $S_{01}$ 504 is used to compare the low power sub-band to the threshold $B_l$. If $I_k < B_l$, then the merging process begins in state $S_2$ 508; otherwise state $S_1$ 506 cycles through the remaining low power core sub-bands until the condition $I_k < B_l$ is achieved. The final states $S_3$ 510, $S_4$ 512, and $S_5$ 514 are used to determine how the final core sub-bands in $\Phi$ are to be added to $\hat{\Phi}$: state $S_3$ 510 adds $\Phi_K$ and $\Phi_{K-1}$ to $\hat{\Phi}$; states $S_4$ 512 and $S_5$ 514 adds $\Phi_K$ to $\hat{\Phi}$.

wherein the first objective function comprises a power function from the sensed power set divided by an empirical measure of a SINR for a sub-frequency of the plurality of sub-frequencies, and wherein the power function further comprises a peak transmit power of the radar system multiplied by a gain of an antenna of the radar system, multiplied by a wavelength of a carrier of the sub-frequency.

The techniques provided by the embodiments herein may be implemented on almost any radar application that can use spectrum monitoring, for example any of surface to air tracking radar, ground penetration radar, ground moving target indication, nonlinear radar, and other military radar tracking applications.

The embodiments herein may be embodied as a computer program product configured to include a pre-configured set of instructions, which when performed, can result in actions as stated in conjunction with the methods described above. In an example, the pre-configured set of instructions can be stored on a tangible non-transitory computer readable

TABLE II

Action table for the state space diagram in FIG. 5

|  | k | $\hat{k}$ | $\hat{\Gamma}_{\hat{k}}$ | $\hat{S}_{\hat{k}}$ | $\hat{E}_{\hat{k}}$ | Sum |
|---|---|---|---|---|---|---|
| $S_0\ 502 \rightarrow S_2\ 508$ | k + 1 | NA | $\hat{\Gamma}_{\hat{k}} = \bar{\Gamma}_k$ | $\hat{S}_{\hat{k}} = \bar{S}_k$ | $\hat{E}_{\hat{k}} = \bar{E}_k$ | 1 |
| $S_{01}\ 504 \rightarrow S_1\ 506$ | k + 2 | NA | $\hat{\Gamma}_{\hat{k}} = \bar{\Gamma}_k$ | $\hat{S}_{\hat{k}} = \bar{S}_k$ | $\hat{E}_{\hat{k}} = \bar{E}_k$ | 1 |
| $S_{01}\ 504 \rightarrow S_2\ 508$ | k + 2 | NA | $\hat{\Gamma}_{\hat{k}} = \bar{\Gamma}_k + \bar{\Gamma}_{k+1}$ | $\hat{S}_{\hat{k}} = \bar{S}_k$ | $\hat{E}_{\hat{k}} = \bar{E}_{k+1}$ | 2 |
| $S_1\ 506 \rightarrow S_1\ 506$ | k + 2 | $\hat{k} + 2$ | $\hat{\Gamma}_{\hat{k}+1} = \bar{\Gamma}_{k-1}$, $\hat{\Gamma}_{\hat{k}+2} = \bar{\Gamma}_k$ | $\hat{S}_{\hat{k}+1} = \bar{S}_{k-1}$, $\hat{S}_{\hat{k}+2} = \bar{S}_k$ | $\hat{E}_{\hat{k}+1} = \bar{E}_{k-1}$, $\hat{E}_{\hat{k}+2} = \bar{E}_k$ | 4 |
| $S_1\ 506 \rightarrow S_2\ 508$ | k + 2 | $\hat{k} + 1$ | $\hat{\Gamma}_{\hat{k}+1} = \bar{\Gamma}_{k-1} + \bar{\Gamma}_k + \bar{\Gamma}_{k+1}$ | $\hat{S}_{\hat{k}+1} = \bar{S}_{k-1}$ | $\hat{E}_{\hat{k}+1} = \bar{E}_{k+1}$ | 6 |
| $S_2\ 508 \rightarrow S_1\ 506$ | k + 2 | $\hat{k} + 1$ | $\hat{\Gamma}_{\hat{k}+1} = \bar{\Gamma}_k$ | $\hat{S}_{\hat{k}+1} = \bar{S}_k$ | $\hat{E}_{\hat{k}+1} = \bar{E}_k$ | 2 |
| $S_2\ 508 \rightarrow S_2\ 508$ | k + 2 | NA | $\hat{\Gamma}_{\hat{k}} = \hat{\Gamma}_{\hat{k}} + \bar{\Gamma}_k + \bar{\Gamma}_{k+1}$ | NA | $\hat{E}_{\hat{k}} = \bar{E}_{k+1}$ | 4 |
| $S_1\ 506 \rightarrow S_3\ 510$ | NA | $\hat{k} + 2$ | $\hat{\Gamma}_{\hat{k}+1} = \bar{\Gamma}_{k-1}$, $\hat{\Gamma}_{\hat{k}+2} = \bar{\Gamma}_k$ | $\hat{S}_{\hat{k}+1} = \bar{S}_{k-1}$, $\hat{S}_{\hat{k}+2} = \bar{S}_k$ | $\hat{E}_{\hat{k}+1} = \bar{E}_{k-1}$, $\hat{E}_{\hat{k}+2} = \bar{E}_k$ | 3 |
| $S_1\ 506 \rightarrow S_4\ 512$ | k − 1 | $\hat{k} + 1$ | $\hat{\Gamma}_{\hat{k}+1} = \bar{\Gamma}_{k-1}$ | $\hat{S}_{\hat{k}+1} = \bar{S}_{k-1}$ | $\hat{E}_{\hat{k}+1} = \bar{E}_{k-1}$ | 2 |
| $S_2\ 508 \rightarrow S_5\ 514$ | NA | $\hat{k} + 1$ | $\hat{\Gamma}_{\hat{k}+1} = \bar{\Gamma}_k$ | $\hat{S}_{\hat{k}+1} = \bar{S}_k$ | $\hat{E}_{\hat{k}+1} = \bar{E}_k$ | 1 |

Figure 6:
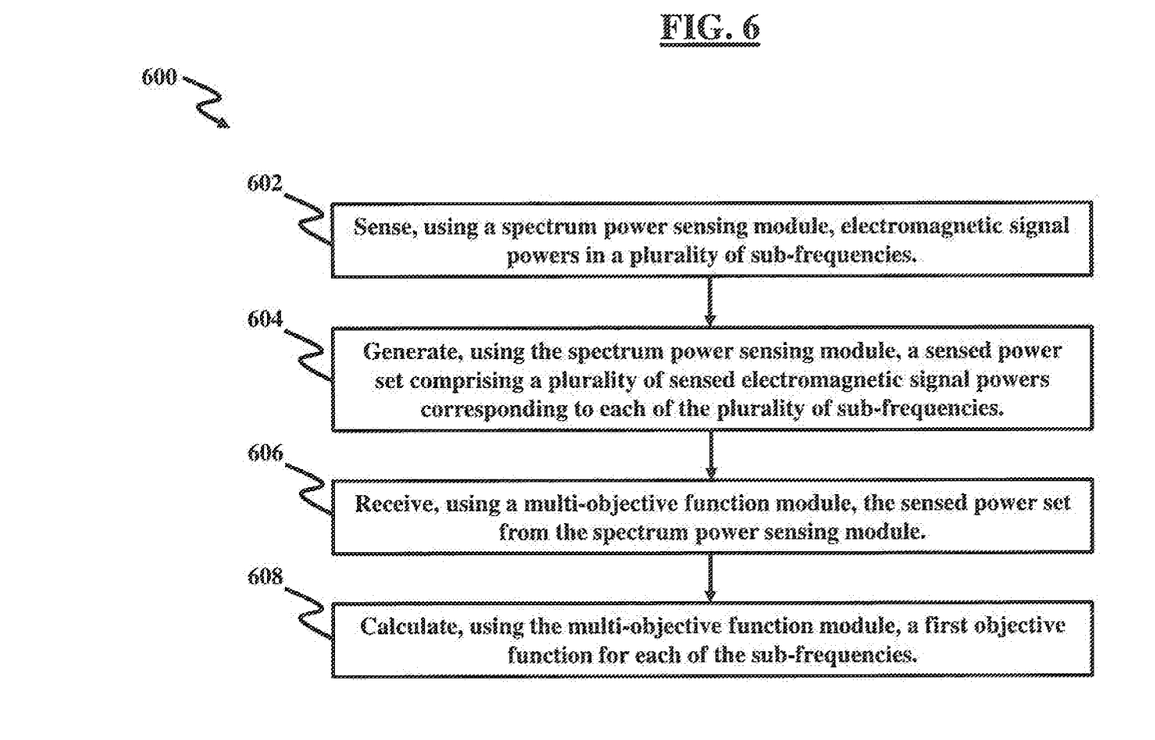
FIG. 6 is a flowchart diagram illustrating a method according to an embodiment herein.

FIG. 6, with reference to FIGS. 1 through 5, illustrates a flow diagram illustrating a method 600 for operating a spectrum sensing radar system 100 according to an embodiment herein. The method 600 may comprise sensing (602), using a spectrum power sensing module 102, electromagnetic signal powers in a plurality of sub-frequencies; generating (604), using the spectrum power sensing module 102, a sensed power set comprising a plurality of sensed electromagnetic signal powers corresponding to each of the plurality of sub-frequencies; receiving (606), using a multi-objective function module 106, the sensed power set from the spectrum power sensing module; and calculating (608), using the multi-objective function module 106, a first objective function for each of the plurality of sub-frequencies, medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon. Such non-transitory computer readable storage media can be any available media that can be accessed by a special purpose device, including the functional design of any special purpose processor as discussed above.

By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose device to perform a certain function or group of functions. Computer-executable instructions also include program modules that are executed by computers in stand-alone or network environments. Generally, program modules include routines, programs, components, data structures, objects, and the functions inherent in the design of special-purpose devices, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

In an exemplary embodiment, the various modules described herein and illustrated in the figures are embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions capable of providing digital and/or analog signals for performing various functions as described herein. The various functions can further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths can be configured as part of a special computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and can be a variable, a data structure, or a function. In the embodiments configured as relational databases (e.g., such Oracle® relational databases), the data objects can be configured as a table or column. Other configurations include specialized objects, distributed objects, object oriented programming objects, and semantic web objects, for example. The data object models can be configured as an application programming interface for creating HyperText Markup Language (HTML) and Extensible Markup Language (XML) electronic documents. The models can be further configured as any of a tree, graph, container, list, map, queue, set, stack, and variations thereof. The data object files are created by compilers and assemblers and contain generated binary code and data for a source file. The database components can include any of tables, indexes, views, stored procedures, and triggers.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor, and may be configured, for example, as a kiosk.

The embodiments herein can include both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
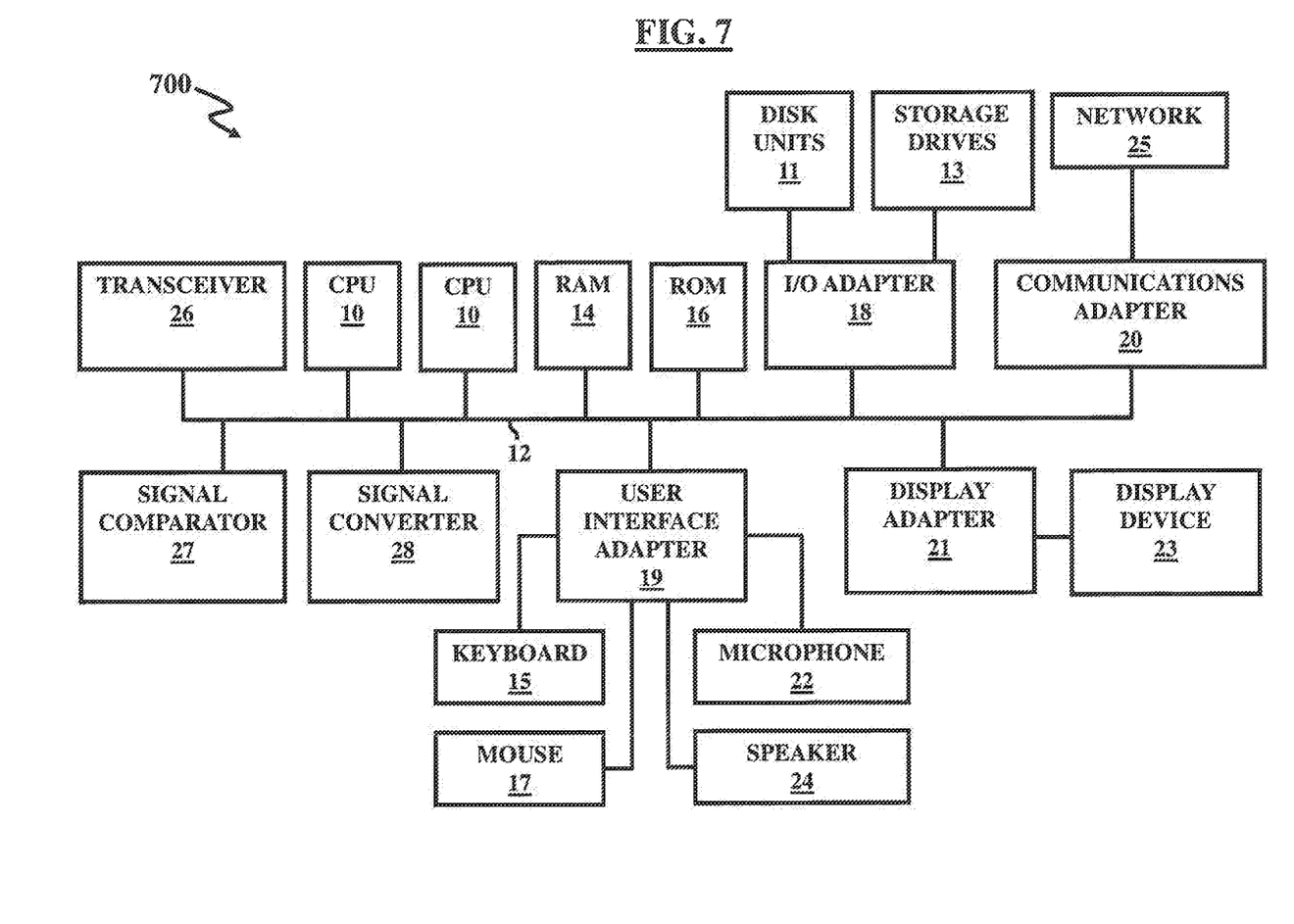
FIG. 7 is a schematic diagram illustrating an exemplary computer architecture used in accordance with the embodiments herein.

A representative hardware environment for practicing the embodiments herein is depicted in FIG. 7, with reference to FIGS. 1 through 6. This schematic drawing illustrates a hardware configuration of an information handling/computer system 700 in accordance with the embodiments herein. The system 700 comprises at least one processing device 10. The special-purpose CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system 700 can read the inventive instructions on the program storage devices and follow these instructions to execute the methodology of the embodiments herein. The system 700 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A spectrum sensing radar system comprising:
at least one computer processor configured to execute computer-executable instructions stored in a non-transitory computer memory, said computer-executable instructions comprising a plurality of modules including:
a spectrum power sensing module configured to:
receive electromagnetic signal powers in the ambient electromagnetic environment in a plurality of sub-frequencies over the entire operational frequency band of the radar system sensed by a radar transceiver of the radar system, and
generate a sensed power set comprising groups of one or more of said plurality of sub-frequencies, each group having a start and an end frequency and a measure of the interference power of the group; and
a multi-objective function module configured to:
receive said sensed power set from said spectrum power sensing module, and
perform analysis on various permutations of each received group and contiguous combinations of the received groups of sub-frequencies by;
calculating a signal plus noise ratio (SINR) for each of said permutations, which comprises a received power function of a received radar signal for each permutation divided by the measure of interference power for each permutation; and
calculating the bandwidth for each permutation;
determining, from the various permutations, the permutation which provides the optimal SINR and bandwidth for operation of said radar system; and
generating and transmitting, to the radar transceiver, a radar transmit frequency set, a radar transmit power set, and a radar transmit bandwidth based on the determined optimal permutation.

2. The spectrum sensing radar system of claim 1, wherein, in determining the permutation which provides the optimal SINR and bandwidth for operation of said radar system, said multi-objective function module is further configured to maximize a first objective function of said SINR and a second objective function of said bandwidth simultaneously for the permutation, subject to said first objective function being greater than a minimum SINR pre-determined boundary, and subject to said second objective function being greater than a minimum bandwidth pre-determined boundary.

3. The spectrum sensing radar system of claim 2, in determining the permutation which provides the optimal SINR and bandwidth for operation of said radar system, said multi-objective function module is further configured to employ a weighted sum multi-objective optimization (WSMO) of the first and second objective functions.

4. The spectrum sensing radar system of claim 1, further comprising the radar transceiver, wherein said radar transceiver is configured to:
receive said radar transmit frequency set and said radar transmit bandwidth set from said multi-objective function module;
generate electromagnetic signals in accordance with said radar transmit frequency set, said radar transmit power set, and said radar transmit bandwidth set; and
receive reflections of said electromagnetic signals from said target.

5. The spectrum sensing radar system of claim 1, wherein upon said radar transceiver transmitting said electromagnetic signals, said spectrum power sensing module is further configured to:

repeat said sensing electromagnetic signal power in said plurality of sub-frequencies; and generate a new sensed power set comprising new groups of one or more of said plurality of sub-frequencies, each group having a start and an end frequency and a measure of the interference power of the group.

6. The spectrum sensing radar system of claim 5, wherein upon said spectrum power sensing module generating said new sensed power set, said multi-objective function module is further configured to:

receive said new sensed power set from said spectrum power sensing module;

perform analysis on various new permutations of each new received group and contiguous combinations of the received new groups of sub-frequencies by recalculating the SINR and bandwidth for each of the new permutations;

determine, from the various new permutations, the permutation which provides the optimal SINR and bandwidth for operation of said radar system; and generate and transmit, to the radar transceiver, a new radar transmit frequency set, a new radar transmit power set, and a new radar transmit bandwidth set based on the new optimal permutation.

7. The spectrum sensing radar system of claim 1, wherein, in generating said sensed power set, the multi-objective function module is further configured to:

analyze the sensed electromagnetic signal powers for the plurality of sub-frequencies;

identify sub-frequencies of the sensed electromagnetic signal powers as either high or low power with respect to a predetermined power threshold; and group any closely-spaced high sub-frequencies within a predetermined sub-bandwidth threshold as one high sub-frequency.

8. The spectrum sensing radar system of claim 1, wherein, in calculating the SINR, said received power function of the received radar signal further comprises a peak transmit power of the radar system multiplied by a gain of an antenna of said radar system, a wavelength of a carrier of said sub-frequency, and a radar cross-section of the target.

9. The spectrum sensing radar system of claim 8, wherein, in calculating the SINR, said received power function of the received radar signal further comprises a pulse width of said radar system multiplied by said wavelength of said carrier of said sub-frequency group or groups corresponding to the permutation.

10. The spectrum sensing radar system of claim 9, wherein, in calculating the SINR, said received power function of the received radar signal further comprises a number of pulses within a coherent processing interval of said radar system multiplied by said pulse width of said radar system, further multiplied by said bandwidth of said sub-frequency group or groups corresponding to the permutation.

11. The spectrum sensing radar system of claim 10, wherein, in calculating the SINR, said received power function of the received radar signal further comprises said bandwidth of said sub-frequency group or groups corresponding to the permutation divided by a range to a target.

12. The spectrum sensing radar system of claim 1, wherein the received power of the received radar signal of the permutation is defined as follows:

$$P_r(\beta_i)=P_t G^2 \lambda^2 \sigma N_p/[(4\pi)^3 R^4],$$

where $P_t$ is the peak transmit power of the radar system, G is the antenna gain, $\lambda$ is the wavelength of the carrier frequency, $\sigma$ is the radar cross-section of the target, $N_p$ is the number of pulses within a coherent processing interval, and R is the range to target.

13. A method of operating a spectrum sensing radar system, said method comprising:

sensing, by a radar transceiver of the radar system, electromagnetic signal powers in the ambient electromagnetic environment in a plurality of sub-frequencies over the entire operational frequency band of the radar system;

generating a sensed power set comprising groups of one or more of said plurality of sub-frequencies, each group having a start and an end frequency and a measure of the interference power of the group;

receiving said sensed power set from said spectrum power sensing module;

performing analysis on various permutations of each received group and contiguous combinations of the received groups of sub-frequencies by:

calculating a signal plus noise ratio (SINR) for each of said permutations, which comprises a received power function of a received radar signal for each permutation divided by the measure of interference power for each permutation; and calculating the bandwidth for each permutation;

determining, from the various permutations, the permutation which provides the optimal SINR and bandwidth for operation of said radar system; and generating and transmitting, to the radar transceiver, a radar transmit frequency set, a radar transmit power set, and a radar transmit bandwidth based on the determined optimal permutation.

14. The method of claim 13, wherein the received power of the received radar signal of the permutation is defined as follows:

$$P_r(\beta_i)=P_t G^2 \lambda^2 \sigma N_p/[(4\pi)^3 R^4],$$

where $P_t$ is the peak transmit power of the radar system, G is the antenna gain, $\lambda$ is the wavelength of the carrier frequency, $\sigma$ is the radar cross-section of the target, $N_p$ is the number of pulses within a coherent processing interval, and R is the range to target.

15. The method of claim 14, wherein wherein determining the permutation which provides the optimal SINR and bandwidth for operation of said radar system comprises maximizing a first objective function of said SINR and a second objective function of said bandwidth for the permutation simultaneously, subject to said first objective function being greater than a minimum SINR pre-determined boundary, and subject to said second objective function being greater than a minimum bandwidth pre-determined boundary.

16. The method of claim 13, further comprising:

receiving, at a radar transceiver of the radar system, said radar transmit frequency set, said radar transmit power set, and said radar transmit bandwidth set;

generating, using said radar transceiver, electromagnetic signals in accordance with said radar transmit frequency set, said radar transmit power set, and said radar transmit bandwidth set; and receiving, using said radar transceiver, reflections of said electromagnetic signals from said target, wherein upon said radar transceiver transmitting said electromagnetic signals, said method further comprising:

repeating, said sensing electromagnetic signal power in said plurality of sub-frequencies; and generating, a new sensed power set comprising new groups of said plurality of sub-frequencies, each group having a start and an end frequency and a measure of the interference power of the group, receiving said new sensed power set from said spectrum power sensing module;

performing analysis on various new permutations of each received new group and contiguous combinations of the received new groups of sub-frequencies by recalculating the SINR and bandwidth for each of the new permutations;

determining, from the various new permutations, the permutation which provides the optimal SINR and bandwidth for operation of said radar system; and generating and transmitting, to the radar transceiver, a new radar transmit frequency set, a new radar transmit power set, and a new radar transmit bandwidth set based on the new optimal permutation.

17. A non-transitory program storage device readable by a computer having a plurality of modules comprising a program of instructions executable by said computer to perform a method of operating a spectrum sensing radar system, said method comprising:

receiving, using a spectrum power sensing module, electromagnetic signal powers in the ambient electromagnetic environment in a plurality of sub-frequencies over the entire operational frequency band of the radar system sensed by a radar transceiver of the radar system;

generating, using said spectrum power sensing module, a sensed power set comprising groups of one or more of said plurality of sub-frequencies, each group having a start and an end frequency and a measure of the interference power of the group;

receiving, using a multi-objective function module, said sensed power set from said spectrum power sensing module;

performing, using said multi-objective function module, analysis on various permutations of each received group and contiguous combinations of the received groups of sub-frequencies by:

calculating a signal plus noise ratio (SINR) for each of said permutations, which comprises a received power function of a received radar signal for each permutation divided by the measure of interference power for each permutation; and calculating the bandwidth for each permutation;

determining, using said multi-objective function module, the permutation from the various permutations, which provides the optimal SINR and bandwidth for operation of said radar system; and generating and transmitting, using said multi-objective function module, a radar transmit frequency set, a radar transmit power set, and a radar transmit bandwidth set based on the determined optimal permutation to a radar transceiver of the radar system.

18. The program storage device of claim 17, wherein the received power of the received radar signal of the permutation is defined as follows:

$$P_r(\beta_i) = P_t G^2 \lambda^2 \sigma N_P / [(4\pi)^3 R^4],$$

where $P_t$ is the peak transmit power of the radar system, G is the antenna gain, $\lambda$ is the wavelength of the carrier frequency, $\sigma$ is the radar cross-section of the target, $N_p$ is the number of pulses within a coherent processing interval, and R is the range to target.

19. The program storage device of claim 18, wherein said multi-objective function module is further configured to determine the permutation which provides the optimal SINR and bandwidth for operation of said radar system comprises maximizing a first objective function of said SINR and a second objective function of said bandwidth for the permutation simultaneously, subject to said first objective function being greater than a minimum SINR pre-determined boundary, and subject to said second objective function being greater than a minimum bandwidth pre-determined boundary.

20. The program storage device of claim 17, wherein said method further comprises:

repeating, by said spectrum power sensing module, said receiving of electromagnetic signal power in the ambient electromagnetic environment in said plurality of sub-frequencies over the entire operational frequency band of the radar system sensed by the radar transceiver of the radar system; and generating, by said spectrum power sensing module, a new sensed power set comprising new groups of said plurality of sub-frequencies, each group having a start and an end frequency and a measure of the interference power of the group;

receiving, by said multi-objective function module, said new sensed power set from said spectrum power sensing module;

performing analysis on various new permutations of each received new group and contiguous combinations of the received new groups of sub-frequencies by recalculating, by said multi-objective function module, the SINR and bandwidth for each of the new permutations;

determining, from the various new permutations, the permutation which provides the optimal SINR and bandwidth for operation of said radar system; and generating and transmitting, by said multi-objective function module, a new radar transmit frequency set, a new radar transmit power set, and a new radar transmit bandwidth set based on the new optimal permutation to the radar transceiver.

* * * * *